United States Patent Office 3,717,661
Patented Feb. 20, 1973

---

3,717,661
PROCESS FOR THE PREPARATION OF 1-INDAN-CARBOXYLIC ACIDS AND INTERMEDIATE THEREFOR
Peter Frederick Juby, Dewitt, William Reuther Goodwin, Syracuse, and Thomas William Hudyma, Dewitt, N.Y., assignors to Bristol-Myers Company, New York, N.Y.
No Drawing. Filed Oct. 28, 1970, Ser. No. 84,892
Int. Cl. C07c 63/44; C07d 73/00
U.S. Cl. 260—327 M                    6 Claims

ABSTRACT OF THE DISCLOSURE

Levorotatory 5-cyclohexyl-1-indancarboxylic acid is a useful anti-inflammatory agent in the treatment of inflammatory diseases in animals, including man. As such, a new and more efficient process has been discovered for the preparation of large quantities of the compound.

BACKGROUND OF THE INVENTION

(1) Field of the invention

The process of the present invention is a new and more efficient procedure for the preparation of large quantities of (±)-5-cyclohexyl-1-indancarboxylic acid.

(2) Description of the prior art

The process of the present invention is new and novel and produces yields several fold those obtained by the process described in U.S. patent application Ser. No. 858,870, filed Sept. 17, 1969, now U.S. Pat. No. 3,565,943.

The art most closely related to that of the process of the instant invention can be found in the following references:

(a) R. T. Hart and R. F. Tebbe, J. Am. Chem. Soc., 72, 3286 (1950).
(b) E. J. Corey and D. Seebach, Angew. Chem., Int. Ed. Engl., 4, 1075 (1965).
(c) D. Seebach, Synthesis, 1, 17 (1969).
(d) D. Seebach, N.R. Jones, and E. J. Corey, J. Org. Chem., 33, 300 (1968).

SUMMARY OF THE INVENTION

This invention is a new and novel process for the preparation of the compound having the formula

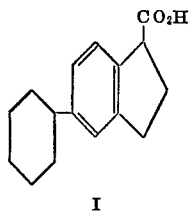

I which process comprises the consecutive steps of (A) Treating cyclohexylbenzene with β-chloropropionyl chloride in the presence of aluminum chloride followed by concentrated sulfuric acid to produce the compound having the formula

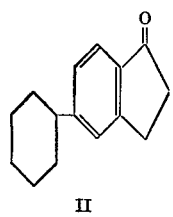

II (B) Treating compound II with a solution of 1,3-dithiane activated with butyllithium to produce the compound having the formula

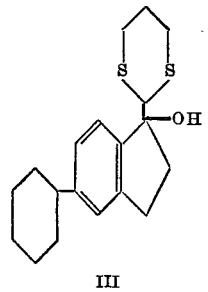

III (C) Dehydrating compound III by treatment with p-toluenesulfonic acid to produce the compound having the formula

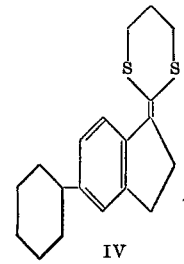

IV and (D) Hydrolyzing Compound IV with aqueous acid to produce the compound having the Formula I.

DISCLOSURE OF THE INVENTION

This invention relates to a new and novel and more efficient process for the preparation of nonsteroidal anti-inflammatory agents having the name (±)-5-cyclohexyl-1-indancarboxylic acid, and more particularly the compound (−)-5-cyclohexyl-1-indancarboxylic acid which is the more potent isomer (U.S. patent application Ser. No. 858,870, filed Sept. 17, 1969).

The compounds produced by the process are characterized by the formula

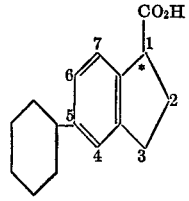

The carbon to which the carboxyl group is attached is an asymmetric carbon atom (*) such that the compounds exist in two isomeric forms; dextro- and levorotatory isomers. Of these two isomers, the levorotatory isomer is the most potent isomer as an anti-inflammatory agent. However, the dextrorotatory isomer is also of importance inasmuch as it can be racemized to produce the desired levorotatory isomer.

It was an object of the instant invention to provide a new, novel and more efficient process for the preparation of these compounds, said compounds being useful in the treatment of a variety of inflammatory diseases such as rheumatoid arthritis, rheumatoid spondylitis, osteoarthritis, gout and other similar afflictions.

The process of the instant invention can be illustrated by the following diagram.

Steps A-C

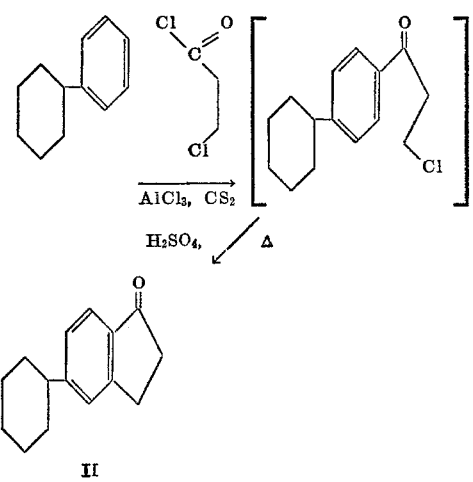

Step D

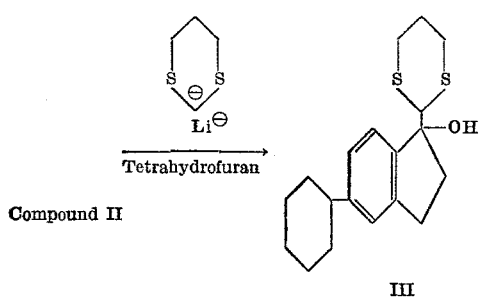

Compound II

Step E

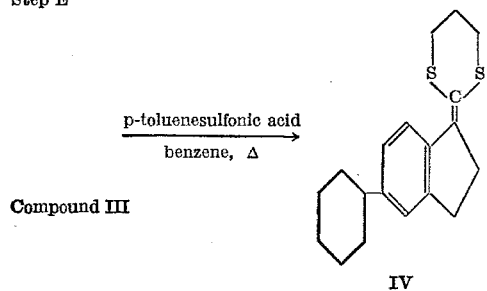

Compound III

Step F

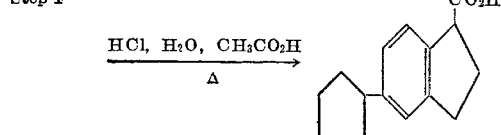

Compound IV

Step G

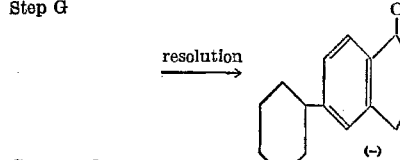

Compound I
and

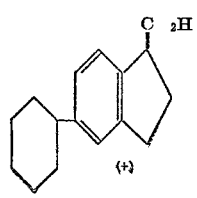

Ib

The objectives of the present invention have been achieved by the provision of the process which comprises the consecutive steps of (A) Treating cyclohexylbenzene with a β-halopropionyl halide (chloro, bromo or iodo), but preferably chloro, in a ratio of at least 1 mole of the halopropionyl halide per mole of cyclohexylbenzene, but preferably in a ratio of about 1.05 to 1, in the presence of an acylation catalyst selected from the group comprising $AlCl_3$, $SnCl_4$, $FeCl_3$, $TiCl_4$ and $ZnCl_2$, but preferably $AlCl_3$, in a ratio of at least 1 mole of acylation catalyst per mole of cyclohexylbenzene, but preferably in a ratio of about 1.2 to 1, in the presence of an organic solvent essentially inert to the reaction conditions selected from the group comprising carbon disulfide, methylene chloride, ethylene chloride, nitrobenzene and the like, but preferably carbon disulfide, for a period of 1 to 10 hours, but preferably about 2 to 5 hours, at room temperature;

(B) Adding a concentrated strong acid selected from the group comprising sulfuric acid, phosphoric acid, polyphosphoric acid, hydrofluoric acid and trifluoroacetic acid, but preferably concentrated sulfuric acid, in a ratio of at least 3 moles of strong concentrated acid per mole of cyclohexylbenzene starting material, but preferably in a ratio of about 7 to 1;

(C) Heating, preferably in the range of about 75° C. to about 125° C., to produce the compound having the formula

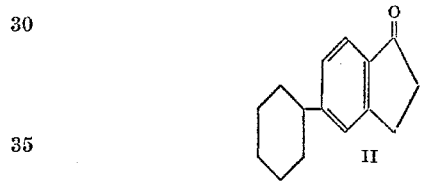

(D) Treating Compound II with a compound having the formula $(Z)_y$—X in which Z is a radical of the formula

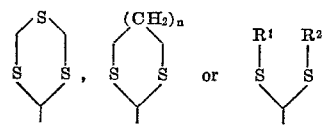

in which X is a metal cation selected from the group comprising Li, Mg, Zn, Cd and Cu, but preferably Li, n is an integer of 0 to 3, but is preferably 1, $R^1$ and $R^2$ are (lower)alkyl, y is an integer equal to the valence of X, in a ratio of at least 1 mole of the sulfur compound per mole of Compound II, but preferably in a ratio of about 1.2 moles of sulfur compound per mole of Compound II, at a temperature in the range of −20° C. to +25° C., but preferably at about 0° C., for a period of time of 5 to 30 hours, but preferably about 15 to 25 hours, to produce the compound having the formula

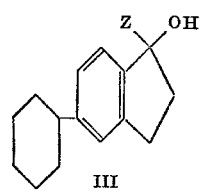

in which Z is as defined above;

(E) dehydrating Compound III by treatment with a dehydrating agent selected from the group comprising: mineral acids such as sulfuric, phosphoric, phosphorous and hydrochloric; POCl₃; SOCl₂; arylsulfonic acids having the formula

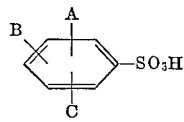

in which A, B or C are alike or different and are hydrogen, halogen, (lower)alkyl, (lower)alkoxy, nitro or cyano; activated carboxylic acids such as F₃C—CO₂H, F₂CH—CO₂H and

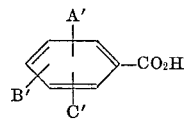

wherein A', B', C' are alike or different but are hydrogen, nitro, fluoro or cyano; and alkylsulfonic acids having the formula

R—SO₃H in which R is (lower)alkyl, and the like, but preferably p-toluene-sulfonic acid, in an anhydrous organic solvent selected from the group comprising benzene, toluene, xylene, and the like, but preferably benzene, with the aid of heat, preferably at about reflux temperature, azeotropically removing the water so generated to produce the compound having the formula

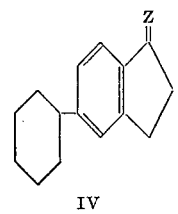

IV and (F) Hydrolyzing Compound IV with a mixture of concentrated hydrochloric acid and glacial acetic acid by heating at reflux temperatures for 1 to 5 hours, but preferably 2 to 3 hours, to produce the compound having the formula

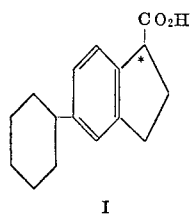

I

A preferred embodiment of the present invention is the process which comprises the consecutive steps of (A) Treating cyclohexylbenzene with a β-halopropionyl halide of the formula

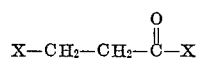

in which X is bromo, iodo or chloro, in a ratio of at least 1 mole of the halopropionyl halide per mole of cyclohexylbenzene, in the presence of an acylation catalyst selected from the group comprising AlCl₃, SnCl₄, FeCl₃, TiCl₄, and ZnCl₂, in a ratio of at least 1 mole of acylation catalyst per mole of cyclohexylbenzene, in the presence of an organic solvent essentially inert to the reaction conditions for a period of about 1 to 10 hours, at room temperature;

(B) Adding a concentrated strong acid selected from the group comprising sulfuric acid, phosphoric acid, polyphosphoric acid, hydrofluoric acid and trifluoroacetic acid, in a ratio of at least 3 moles of strong concentrated acid per mole of cyclohexylbenzene starting material;

(C) Heating to produce the compound having the formula

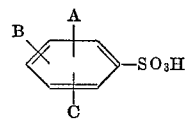

II (D) Treating Compound II with a compound having the formula (Z)ᵧ—X in which Z is a radical of the formula

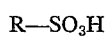

in which X is a metal cation selected from the group comprising Li, Mg, Zn, Cd and Cu, n is an integer of 0 to 3, R¹ and R² are (lower)alkyl, y is an integer equal to the valence of X, in a ratio of at least 1 mole of the sulfur compound per mole of Compound II, at a temperature in the range of —20° C. to +25° C., for a period of time of 5 to 30 hours, to produce the compound having the formula

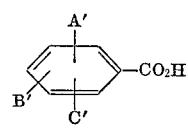

III in which Z is as defined above;

(E) Dehydrating Compound III by treatment with a dehydrating agent selected from the group comprising: mineral acids such as sulfuric, phosphoric, phosphorous and hydrochloric; POCl₃; SOCl₂; arylsulfonic acids having the formula

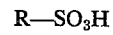

in which A, B or C are alike or different and are hydrogen, halogen, (lower)alkyl, (lower)alkoxy, nitro or cyano; activated carboxylic acids such as F₃C—CO₂H, F₂CH—CO₂H and

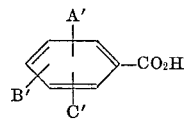

wherein A', B', C' are alike or different but are hydrogen, nitro, fluoro or cyano; and alkylsulfonic acids having the formula

R—SO₃H in which R is (lower)alkyl; n in an anhydrous organic solvent selected from the group comprising benzene, toluene and xylene, with the aid of heat, to produce the compound having the formula

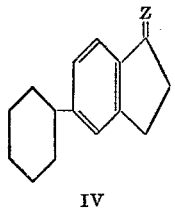

IV and (F Hydrolyzing Compound IV with a mixture of concentrated hydrochloric acid and glacial acetic acid by heating at reflux temperatures for 1 to 5 hours, to produce the compound having the formula

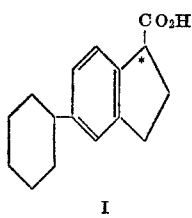

I

A more preferred embodiment is the process which comprises the consecutive steps of:

(A) Treating cyclohexylbenzene with a β-halopropionyl halide of the formula

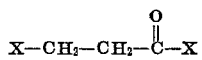

in which X is chloro, bromo or iodo in a ratio of at least 1 mole of the halopropionyl halide per mole of cyclohexylbenzene, in the presence of an acylation catalyst selected from the group comprising $AlCl_3$, $SnCl_4$, $FeCl_3$, $TiCl_4$ and $ZnCl_2$, in a ratio of at least 1 mole of acylation catalyst per mode of cyclohexylbenzene, in the presence of an organic solvent selected from the group comprising carbon disulfide, methylene chloride, ethylene chloride and nitrobenzene, for a period of 1 to 10 hours, at room temperature; removing the solvent;

(B) Adding a concentrated strong acid selected from the group comprising sulfuric acid, phosphoric acid, polyphosphoric acid, hydrofluoric acid and trifluoroacetic acid, in a ratio of at least 3 moles of strong concentrated acid per mole of cyclohexylbenzene starting material:

(C) Heating to produce the compound having the formula

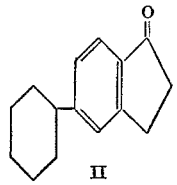

II (D) Treating Compound II with a compound having the formula $(Z)_y$—X in which Z is a radical of the formula

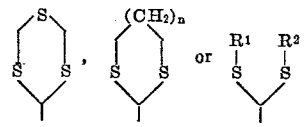

in which X is a metal cation selected from the group comprising Li, Mg, Zn, Cd and Cu, n is an integer of 1 to 2, $R^1$ and $R^2$ are (lower)-alkyl, y is an integer equal to the valence of X, in a ratio of at least 1 mole of the sulfur compound per mole of Compound II, at a temperature in the range of —20° C. to +25° C., for a period of time of 5 to 30 hours, to produce the compound having the formula

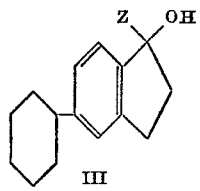

III in which Z is as defined above;

(E) Dehydrating Compound III by treatment with a dehydrating agent selected from the group comprising: $POCl_3$, $SOCl_2$, arylsulfonic acids having the formula

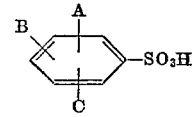

in which A, B or C are alike or different and are hydrogen, halogen, (lower)alkyl, (lower)alkoxy, nitro or cyano; and alkylsulfonic acids having the formula

R—$SO_3$—H in which R is (lower)alkyl; in an anhydrous organic solvent selected from the group comprising benzene, toluene and xylene, with the aid of heat, to produce the compound having the formula

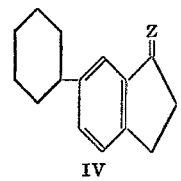

IV and (F) Hydrolyzing Compound IV with a mixture of concentrated hydrochloric acid and glacial acetic acid by heating at reflux temperatures for 1 to 5 hours, to produce the compound having Formula I.

Another more preferred embodiment is the process of which comprises the consecutive steps of:

(A) Treating cyclohexylbenzene with β-chloropropionyl chloride in a ratio of at least 1 mole of the halopropionyl halide per mole of cyclohexylbenzene, in the presence of an acylation catalyst selected from the group comprising $AlCl_3$, $SnCl_4$, $FeCl_3$, $TiCl_4$ and $ZnCl_2$, in a ratio of at least 1 mole of acylation catalyst per mole of cyclohexylbenzene in the presence of an organic solvent selected from the group comprising carbon disulfide, methylene chloride, ethylene chloride and nitrobenzene, for a period of 1 to 10 hours, at room temperature; removing the solvent in vacuo;

(B) Adding concentrated sulfuric acid in a ratio of at least 3 moles of acid per mole of cyclohexylbenzene starting material;

(C) Heating in the range of about 75° C. to about 125° C., to produce the compound having the formula

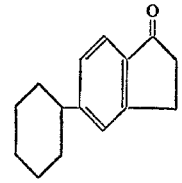

II (D) Treating Compound II with a compound having the formula

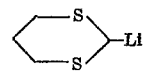

in a ratio of 1.2 moles of sulfur compound per mole of Compound II, at a temperature of about 0° C., for a period of time of about 15 to 25 hours, to produce the compound having the formula

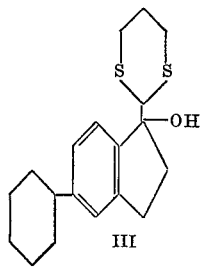

III (E) Dehydrating Compound III by treatment with a dehydrating agent selected from the group comprising arylsulfonic acids having the formula

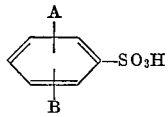

in which A and B are alike or different and are hydrogen or (lower)alkyl in an anhydrous organic solvent selected from the group comprising benzene, toluene and xylene, with the aid of heat at about reflux temperature, azeotropically removing the water so generated to produce the compound having the formula

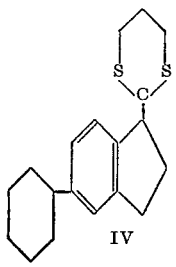

IV and (F) Hydrolyzing Compound IV with a mixture of concentrated hydrochloric acid and glacial acetic by heating at reflux temperatures for about 1 to 5 hours, to produce the compound having Formula I.

A most preferred embodiment is the process of which comprises the consecutive steps of:

(A) Treating cyclohexylbenzene with β-chloropropionyl chloride, in a ratio of about 1.0 to 1.1 moles of acylchloride per mole of cyclohexylbenzene in the presence of AlCl₃, in a ratio of about 1.1 to 1.3 moles of AlCl₃ per mole of cyclohexylbenzene, in the presence of an organic solvent selected from the group comprising carbon disulfide, methylene chloride, ethylene chloride and nitrobenzene, for a period of about 2 to 5 hours at room temperature; removing the solvent in vacuo;

(B) Adding concentrated sulfuric acid in a ratio of about 5 to 10 moles of sulfuric acid per mole of cyclohexylbenzene starting material;

(C) Heating in the range of about 75° C. to about 125° C., to produce the compound having the formula

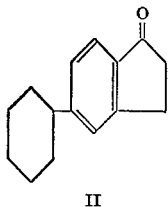

II (D) Treating Compound II with a compound having the formula

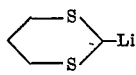

in a ratio of about 1.1 to 1.3 moles of the sulfur compound per mole of Compound II, at a temperature of about 0° C., for a period of time of about 15 to 25 hours, to produce the compound having the formula

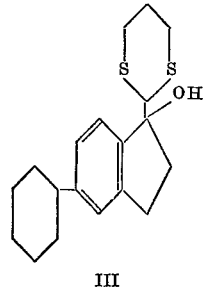

III (E) Dehydrating Compound III by treatment with a catalytic quantity of p-toluenesulfonic acid, in an anhydrous organic solvent selected from the group comprising benzene, toluene and xylene, at about reflux temperature, azeotropically removing the water so generated to produce the compound having the formula

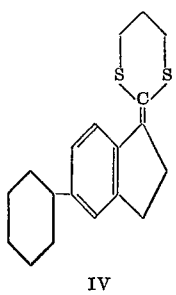

IV and (F) Hydrolyzing Compound IV with a mixture of concentrated hydrochloric acid and glacial acetic acid by heating at reflux temperatures for about 2 to 3 hours, to produce the compound having Formula I.

Another most preferred embodiment is the process of which comprises the consecutive steps of:

(A) Treating cyclohexylbenzene with β-chloropropionyl chloride, in a ratio of about 1.0 to 1.1 moles of acylchloride per mole of cyclohexylbenzene in the presence of AlCl₃, in a ratio of about 1.1 to 1.3 moles of AlCl₃ per mole of cyclohexylbenzene, in the presence of carbon disulfide, for a period of about 2 to 5 hours at room temperature, removing the solvent in vacuo;

(B) Adding concentrated sulfuric acid in a ratio of about 5 to 10 moles of sulfuric acid per mole of cyclohexylbenzene starting material;

(C) Heating in the range of about 75° C. to about 100° C., to produce the compound having the formula

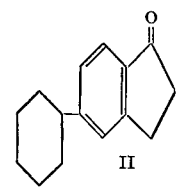

II (D) Treating Compound II with a compound having the formula

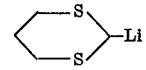

in a ratio of about 1.1 to 1.3 moles of the sulfur compound per mole of Compound II, at a temperature of about 0° C., for a period of time of about 15 to 25 hours, to produce the compound having the formula

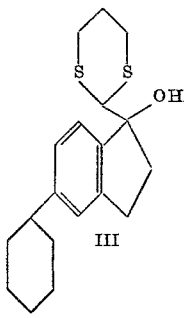

III (E) Dehydrating Compound III by treatment with a catalytic quantity of p-toluenesulfonic acid, in an anhydrous organic solvent selected from the group comprising benzene, toluene and xylene, at about reflux temperature, azeotropically removing the water so generated to produce the compound having the formula

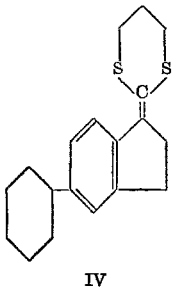

IV and (F) Hydrolyzing Compound IV with a mixture of concentrated hydrochloric acid and glacial acetic acid by heating at reflux temperatures for about 2 to 3 hours, to produce the compound having Formula I.

The process of the instant invention produces yields superior to those obtained by the process taught in U.S. patent application Ser. No. 858,870, filed Sept. 17, 1969.

For example, the process described in Ser. No. 858,870 involves seven separate and tedious steps starting with cyclohexylbenzene and produces overall yields of Compound I of about 10%. The process of the instant invention however, involves but four steps and produces overall yields of about 37% of Compound I based on cyclohexylbenzene.

For the purpose of this disclosure, the term "lower alkyl" shall mean a straight or branched chain aliphatic hydrocarbon of 1 to 6 carbon atoms. The term (lower) in (lower)alkoxy shall have the same connotation.

Another preferred embodiment is the (—)α-(1-naphthyl)ethylamine salt of (—)-5-cyclohexyl-1-indancarboxylic acid.

DESCRIPTION OF THE PREFERRED EMBODIMENTS

Example 1

Preparation of 5-cyclohexyl-1-indanone.—A solution of β-chloropropionyl chloride (13.33 g., 0.105 mole) and cyclohexylbenzene (16.03 g., 0.1 mole) in carbon disulfide (25 ml.) was added dropwise with stirring over a period of 15 minutes to a cooled (ice-water) suspension of aluminum chloride (16.0 g., 0.12 mole) in carbon disulfide (60 ml.). The mixture was then stirred at room temperature for 3 hours. The mixture was concentrated in a rotary evaporator. Sulfuric acid (250 ml. of specific gravity 1.84) was added slowly with stirring and cooling (ice water) to the residual oil. After the addition was complete the mixture was stirred at room temperature for 15 minutes. The mixture was then heated by means of an oil bath, the temperature of which was slowly raised to 100° C. and maintained at this temperature for 2 hours. The mixture was then allowed to stand at room temperature for 15 hours. The mixture was poured onto ice (1 kg.). The resulting mixture was extracted with diethyl ether (3× 500 ml.). The combined ether solution was washed with water (250 ml.) followed by saturated aqueous sodium bicarbonate (200 ml.), and saturated aqueous sodium chloride (2× 200 ml.). The washed solution was dried over anhydrous sodium sulfate and concentrated in a rotary evaporator to give a yellow-brown solid (19.7 g.), M.P. 64–73° C. The product was recrystallized with charcoal treatment from n-pentane to give 5-cyclohexyl-1-indanone (14.7 g.) as yellow crystals, M.P. 75–76.5° C. Recrystallization with charcoal treatment from n-pentane gave off-white crystals, M.P. 75.5–77° C.

Analysis.—Calc'd for $C_{15}H_{18}O$ (percent): C, 84.07; H, 8.47. Found (percent): C, 83.99; H, 8.43.

Reference:' R. T. Hart and R. F. Tebee, J. Am. Chem. Soc., 72, 3286 (1950).

Example 2

Preparation of 5-cyclohexyl-1-[2-(1,3-dithianyl)]-1-hydroxyindan.—All the reactants in the following sequence were protected by an atmosphere of nitrogen. A solution of n-butyllithium in hexane (30 ml. of 1.6 M, 0.048 mole of n-butyllithium) was added over about 15 minutes to a cooled (—25° C.) solution in 1,3-dithiane (6.0 g., 0.05 mole) in tetrahydrofuran (66 ml.). The resulting solution was allowed to warm to —15° C. and was then stirred at this temperature for 2 hours. The temperature of the solution was adjusted to —2° C. over about 30 minutes, when a solution of 5-cyclohexyl-1-indanone (8.6 g., 0.04 mole) in tetrahydrofuran (215 ml.) was added over a period of 1 hour while the temperature of the reaction solution was maintained at 0° C. The solution was then allowed to stand at 0° C. for 20 hours. The tetrahydrofuran and hexane solvents were removed under reduced pressure. The residue was partitioned between diethyl ether and 5% aqueous hydrochloride acid. The ether layer was washed successively with 5% aqueous hydrochloric acid, water, and saturated aqueous sodium chloride, and then concentrated to give 5-cyclohexyl-1-[2-(1,3-dithianyl)]-1-hydroxyindan (15.6 g.) as an orange oil.

References: (1) E. J. Corey and D. Seebach, Angew. Chem., Int. Ed. Engl., 4, 1075 (1965).

(2) D. Seebach, Synthesis, 1, 17 (1969).

(3) D. Seebach, N. R. Jones, and E. J. Corey, J. Org. Chem. 33, 300 (1968).

Example 3

5-cyclohexyl-1-[2-(1,3-dithianylidene)]indan.—A solution of crude 5-cyclohexyl-1-[2-(1,3-dithianyl)-1-hydroxyindan (15.6 g.) and p-toluenesulfonic acid monohydrate (1.6 g.) in benzene (200 ml.) was heated under reflux for 30 minutes with continuous removal of the water formed. The cooled solution was washed successively with water, saturated aqueous sodium bicarbonate, water, and saturated aqueous sodium chloride, and was then dried over sodium sulfate. Removal of the solvent gave 5-cyclohexyl-1-[2-(1,3-dithianylidene)]indan (13.7 g.) as a brown oil. This crude material was used directly in the next step of the synthesis.

Crude material from other similar experiments was purified by chromatography on silicic acid with n-pentane. The purified material was recrystallized three times from n-hexane to give 5-cyclohexyl-1-[2-(1,3-dithianylidene)] indan as off-white crystals, M.P. 79–80° C.

Analysis.—Calc'd for $C_{19}H_{24}S_2$ (percent): C, 72.10; H, 7.64; S, 20.26. Found (percent): 72.19; H, 7.75; S, 20.05.

Example 4

Preparation of (±)-5-cyclohexyl-1-indancarboxylic acid.—A mixture of crude 5-cyclohexyl-1-[2-(1,3-dithianylidene)]indan (13.7 g.), glacial acetic acid (210 ml.) and concentrated hydrochloric acid (70 ml.) was heated under reflux for 2 hours. The cooled mixture was concentrated in a rotary evaporator. The residue was dissolved in toluene and the toluene solution was reduced to dryness. The toluene treatment was repeated in order to remove residual actic acid. A methylene chloride solution of the residue was washed with water until the washings were neutral to pH paper. The solution was then exhaustively extracted with 5% aqueous potassium carbonate. The combined carbonate solution was washed with methylene chloride and then stirred at room temperature with activated charcoal. The mixture was filtered, and the filtrate acidified with concentrated hydrochloric acid. The precipitated solid (5.9 g.), M.P. 144–145° C., was recrystallized from Skellysolve B (essentially n-hexane) to give (±)-5-cyclohexyl-1-indancarboxylic acid (5.2 g.), M.P. 145–146° C.

The product so obtained was essentially identical to authentic (±)-5-cyclohexyl-1-indancarboxylic acid obtained by the method described in U.S. patent application Ser. No. 858,870, Example 1.

Reference: D. Seebach, Synthesis, 1, 17 (1969).

EXAMPLE 5 of (−)-5-cyclohexyl-1-indancarboxylic acid.—A solution of (−)-α-(1-ntphthyl)ethylamine (1.76 g., 0.01025 mole) in acetonitrile (2 ml.) was added to a boiling solution of (±)-5-cyclohexyl-1-indancarboxylic acid (5.0 g., 0.0205 mole) in acetonitrile (250 ml.). The boiling solution was partially cooled and was then seeded with the (−)-α-(1-naphthyl)ethylamine salt of authentic * (−)-5-cyclohexyl-1-indancarboxylic acid. The mixture was allowed to cool slowly and then stand at 25° C. for 3 hours. The crystals were collected and washed with cold acetonitrile to give the (−)-α-(1-naphthyl)ethylamine salt of the (−)-acid (3.5 g.), M.P. 156–160° C. This salt was dissolved in boiling acetonitrile (200 ml.) and the volume of the solution reduced to about 100 ml. by boiling. The solution was seeded with the (−)-α-(1-naphthyl)ethylamine salt of authentic * (−)-5-cyclohexyl-1-indancarboxylic acid and allowed to cool slowly and then stand at 25° C. for 3 hours. The crystals were collected and washed with cold acetonitrile to give material (3.2 g.) with M.P. 161–162° C. Recrystallization from acetonitrile gave the salt (3.0 g.) with M.P. 163–164° C. The latter material was partitioned between ethyl acetate (20 ml.) and 0.5 N hydrochloric acid (20 ml.). The ethyl acetate layer was washed successively with 1 N hydrochloric acid (10 ml.), water (2× 10 ml.), and saturated aqueous sodium chloride (10 ml.). The ethyl acetate solution was dried (sodium sulfate) and reduced to dryness to give a solid (1.68 g.), M.P. 108–110° C. with prior softening. Recrystallization from petroleum ether (B.P. 39–50° C.) gave (−)-5-cyclohexyl-1-indancarboxylic acid (1.51 g.) as colorless crystals; M.P. 108–110° C.; $[\alpha]_D^{25}$ −9.69° (c. 2, absolute ethanol) and $$[\alpha]_{365}^{25} -44.76°$$

(c. 2, absolute ethanol).

EXAMPLE 6

Racemization of enriched (+)-5-cyclohexyl - 1 - indancarboxylic acid to (±)-5-cyclohexyl-1-indancarboxylic acid The mother liquors obtained in Example 5 after the removal by filtration of the (−)-α-(1-naphthyl)ethylamine salt of (−)-5-cyclohexyl-1-indancarboxylic acid were taken to dryness in vacuo. The semi-solid was layered

*The (−)-α-(1-naphthyl)ethylamine salt of (−)-5-cyclohexyl-1-indancarboxylic acid was prepared from authentic (−)-5-cyclohexyl-1-indancarboxylic acid obtained by the methods taught in Examples 1 and 4 of U.S. patent application Ser. No. 858,870. The salt seed crystals were prepared by the method taught above wherein (−)-5-cleyohexyl-1-indancarboxylic acid is treated with (−)-α-(1-naphthyl)-ethylamine in boiling acetonitrile, followed by cooling and scratching with a glass rod to induce crystallization. The crystals were collected by filtration and dried.

with benzene and then treated with an excess of 10% hydrochloric acid. After the solids dissolved, the benzene layer was collected, washed with water and taken to dryness in vacuo. The semi-solids were dissolved in methylene chloride and dimethylformamide and treated with thionyl chloride. The mixture was refluxed 2 to 3 hours. The mixture was taken to dryness in vacuo, following which fresh methylene chloride was added, and then the solution was again taken to dryness in vacuo. The oil was dissolved in methylene chloride and the resultant solution was added to cold methanol (slowly) while keeping the temperature below 20° C. The mixture was refluxed for 30 minutes following which the mixture was taken to dryness in vacuo. The product was determined to be essentially pure methyl ester of the (+) enriched 5-cyclohexyl-1-indancarboxylic acid.

The methyl ester was dissolved in isopropanol following which sodium methoxide was added with temperature control to prevent the temperature from rising above 25° C. The mixture was kept at 25° C. for 15 minutes following which it was warmed to 45–50° C. for 30 minutes.

Water was added to the mixture and the solution was refluxed for 3 hours. The solution turned black (pH—11–12). The pH was adjusted to 7.6 with 6 N hydrochloric acid and then treated with activated charcoal. The activated charcoal was removed by filtration and the essentially colorless solution was adjusted to pH 7.0. The solution became turbid. Seed crystals of (±)-5-cyclohexyl-1-indancarboxylic acid were added and the pH further adjusted to 1.5 with stitrring over a 30 minute period. The product crystallized. Additional water was added and the mixture was cooled at 0–5° C. for 1 hour. The product was collected by filtration and was determined to be (±)-5-cyclohexyl-1-indancarboxylic acid. The racemic product can then be resolved by the procedure of Example 5 into additional (−)-5-cyclohexyl-1-indancarboxylic acid.

We claim:
1. A process for the preparation of the compound having the formula

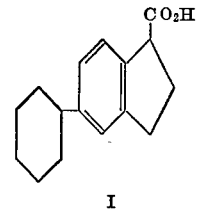

I which process comprises the consecutive steps of
(A) treating cyclohexylbenzene with a β-halopropionyl halide of the formula

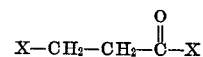

in which X is bromo, iodo or chloro, in a ratio of at least 1 mole of the halopropionyl halide per mole of cyclohexylbenzene, in the presence of an acylation catalyst selected from the group comprising $AlCl_3$, $SnCl_4$, $FeCl_3$, $TiCl_4$ and $ZnCl_2$, in a ratio of at least 1 mole of acylation catalyst per mole of cyclohexylbenzene, in the presence of an organic solvent essentially inert to the reaction conditions, for a period of about 1 to 10 hours, at about room temperature;
(B) adding a concentrated strong acid selected from the group comprising sulfuric acid, phosphoric acid, polyphosphoric acid, hydrofluoric acid and trifluoroacetic acid, in a ratio of at least 3 moles of strong concentrated acid per mole of cyclohexylbenzene starting material;

(C) heating to produce the compound having the formula

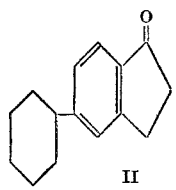

(D) treating Compound II with a compound having the formula

in which Z is a radical of the formula

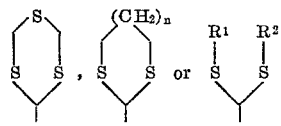

X is a metal cation selected from the group comprising Li, Mg, Zn, Cd, and Cu, $n$ is an integer of 0 to 3, $R^1$ and $R^2$ are (lower)alkyl, $y$ is an integer equal to the valence of X, in a ratio of at least 1 mole of the sulfur compound per mole of Compound II, at a temperature in the range of −20° C. to +25° C., for a period of time of 5 to 30 hours, to produce the compound having the formula

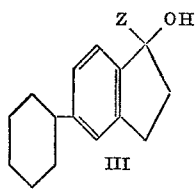

in which Z is as defined above;

(E) dehydrating Compound III by treatment with a dehydrating agent selected from the group comprising: mineral acids selected from the group comprising sulfuric, phosphoric, phosphorous and hydrochloric acid, $POCl_3$ $SOCl_2$; arylsulfonic acids having the formula

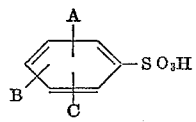

in which A, B or C are alike or different and are hydrogen, halogen, (lower)alkyl, (lower)alkoxy, nitro or cyano; activated carboxylic acids such as $F_3C-CO_2H$, $F_2CH-CO_2H$ and

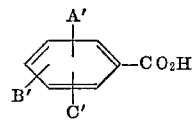

wherein A', B', C' are alike or different but are hydrogen, nitro, fluoro or cyano; and alkylsulfonic acids having the formula

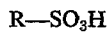

in which R is (lower)alkyl; in an anhydrous organic solvent selected from the group comprising benzene, toluene and xylene, with the aid of heat, to produce the compound having the formula

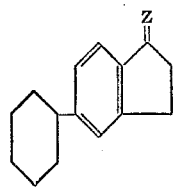

and (F) hydrolyzing Compound IV with a mixture of concentrated hydrochloric acid and glacial acetic acid by heating at reflux temperatures for 1 to 5 hours, to produce the compound having Formula I.

2. The process of claim 1 which comprises (A) treating cyclohexylbenzene with a β-halopropionyl halide of the formula

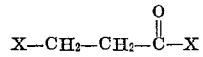

in which X is chloro, bromo or iodo in a ratio of at least 1 mole of the halopropionyl halide per mole of cyclohexylbenzene, in the presence of an acylation catalyst selected from the group comprising $AlCl_3$, $SnCl_4$, $FeCl_3$, $TiCl_4$ and $ZnCl_2$, in a ratio of at least 1 mole of acylation catalyst per mole of cyclohexylbenzene, in the presence of an organic solvent selected from the group comprising carbon disulfide, methylene chloride, ethylene chloride and nitrobenzene, for a period of 1 to 10 hours, at room temperature; removing the solvent;

(B) adding a concentrated strong acid selected from the group comprising sulfuric acid, phosphoric acid, polyphosphoric acid, hydrofluoric acid and trifluoroacetic acid, in a ratio of at least 3 moles of strong concentrated acid per mole of cyclohexylbenzene starting material;

(C) heating to produce the compound having the formula

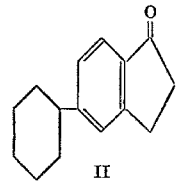

(D) treating Compound II with a compound having the formula

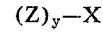

in which Z is a radical of the formula

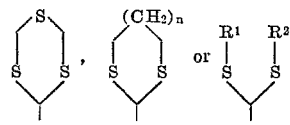

in which X is a metal cation selected from the group comprising Li, Mg, Zn, Cd and Cu, $n$ is an integer of 1 to 2, $R^1$ and $R^2$ are (lower)alkyl, $y$ is an integer equal to the valence of X, in a ratio of at least 1 mole of the sulfur compound per mole of Compound II, at a temperature in the range of −20° C. to +25° C., for a period of time of 5 to 30 hours, to produce the compound having the formula

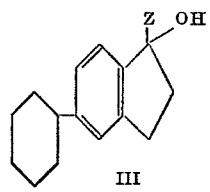

in which Z is as defined above;

(E) dehydrating Compound III by treatment with a dehydrating agent selected from the group comprising: $POCl_3$; $SOCl_2$; arylsulfonic acids having the formula

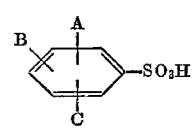

in which A, B or C are alike or different and are hydrogen, halogen, (lower)alkyl, (lower)alkoxy, nitro or cyano; and alkylsulfonic acids having the formula

R—SO₃H in which R is (lower)alkyl; in an anhydrous organic solvent selected from the group comprising benzene, toluene and xylene, with the aid of heat, to produce the compound having the formula

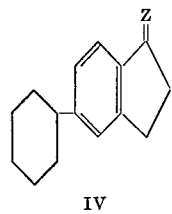

IV and (F) hydrolyzing Compound IV with a mixture of concentrated hydrochloric acid and glacial acetic acid by heating at reflux temperatures for 1 to 5 hours, to produce the compound having Formula I.

3. The process of claim 1 which comprises
(A) treating cyclohexylbenzene with β-chloropropionyl chloride in a ratio of at least 1 mole of the halopropionyl halide per mole of cyclohexylbenzene, in the presence of an acylation catalyst selected from the group comprising AlCl₃, SnCl₄, FeCl₃, TiCl₄ and ZnCl₂, in a ratio of at least 1 mole of acylation catalyst per mole of cyclohexylbenzene, in the presence of an organic solvent selected from the group comprising carbon disulfide, methylene chloride, ethylene chloride and nitrobenzene, for a period of 1 to 10 hours, at room temperature; removing the solvent;
(B) adding concentrated sulfuric acid in a ratio of at least 3 moles of acid per mole of cyclohexylbenzene starting material;
(C) heating in the range of about 75° C. to about 125° C., to produce the compound having the formula

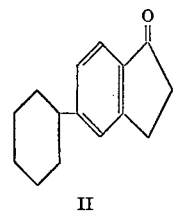

II (D) treating Compound II with a compound having the formula

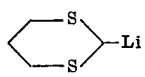

in a ratio of 1.2 moles of sulfur compound per mole of Compound II, at a temperature of about 0° C., for a period of time of about 15 to 25 hours, to produce the compound having the formula

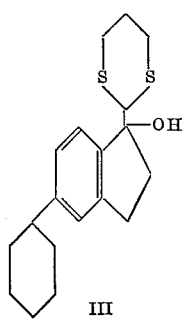

III (E) dehydrating Compound III by treatment with a dehydrating agent selected from the group comprising arylsulfonic acids having the formula

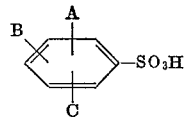

in which A, B or C are alike or different and are hydrogen or (lower)alkyl, in an anhydrous organic solvent selected from the group comprising benzene, toluene and xylene, with the aid of heat at about reflux temperature, azeotropically removing the water so generated to produce the compound having the formula

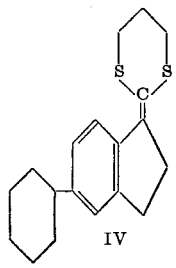

IV and (F) hydrolyzing Compound IV with a mixture of concentrated hydrochloric acid and glacial acetic acid by heating at reflux temperatures for about 1 to 5 hours, to produce the compound having formula I.

4. The process of claim 1 which comprises
(A) treating cyclohexylbenzene with β-chloropropionyl chloride, in a ratio of about 1.0 to 1.1 moles of acyl chloride per mole of cyclohexylbenzene in the presence of AlCl₃, in a ratio of about 1.1 to 1.3 moles of AlCl₃ per mole of cyclohexylbenzene, in the presence of an organic solvent selected from the group comprising carbon disulfide, methylene chloride, ethylene chloride and nitrobenzene, for a period about 2 to 5 hours at room temperature; removing the solvent in vacuo;
(B) adding concentrated sulfuric acid in a ratio of about 5 to 10 moles of sulfuric acid per mole of cyclohexylbenzene starting material;
(C) heating in the range of about 75° C. to about 125° C., to produce the compound having the formula

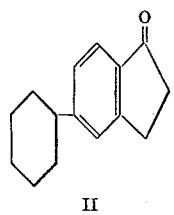

II (D) treating Compound II with a compound having the formula

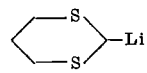

in a ratio of about 1.1 to 1.3 moles of the sulfur compound per mole of Compound II, at a temperature of about 0° C., for a period of time of about 15 to 25 hours, to produce the compound having the formula

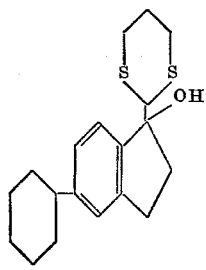

III (E) dehydrating Compound III by treatment with a catalytic quantity of p-toluenesulfonic acid, in an anhydrous organic solvent selected from the group comprising benzene, toluene and xylene, at about reflux temperature, azeotropically removing the water so generated to produce the compound having the formula

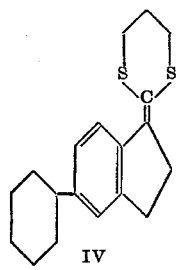

IV and
(F) hydrolyzing Compound IV with a mixture of concentrated hydrochloric acid and glacial acetic acid by heating at reflux temperatures for about 2 to 3 hours, to produce the compound having Formula I.
5. The process of claim 1 which comprises
(A) treating cyclohexylbenzene with β-chloropropionyl chloride, in a ratio of about 1.0 to 1.1 moles of acyl chloride per mole of cyclohexylbenzene in the presence of AlCl₃, in a ratio of about 1.1 to 1.3 moles of AlCl₃ per mole of cyclohexylbenzene, in the presence of carbon disulfide, for a period of about 2 to 5 hours at room temperature; removing the solvent in vacuo;
(B) adding concentrated sulfuric acid in a ratio of about 5 to 10 moles of sulfuric acid per mole of cyclohexylbenzene starting material;
(C) heating in the range of about 75° C. to about 125° C., to produce the compound having the formula

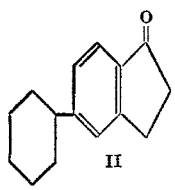

II (D) treating Compound II with a compound having the formula

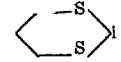

in a ratio of about 1.1 to 1.3 moles of the sulfur compound per mole of Compound II, at a temperature of about 0° C., for a period of time of about 15 to 25 hours, to produce the compound having the formula

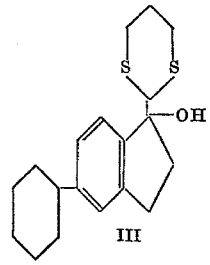

III (E) dehydrating Compound III by treatment with a catalytic quantity of p-toluenesulfonic acid, in an anhydrous organic solvent selected from the group comprising benzene, toluene and xylene, at about reflux temperature, azeotropically removing the water so generated to produce the compound having the formula

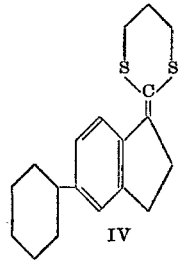

IV and
(F) hydrolyzing Compound IV with a mixture of concentrated hydrochloric acid and glacial acetic acid by heating at reflux temperatures for about 2 to 3 hours, to produce the compound having the Formula I.
6. The compound having the formula

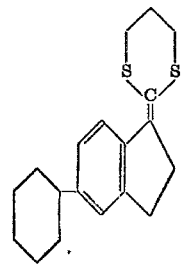

References Cited
UNITED STATES PATENTS
3,565,943   2/1971   Juby et al. _____ 260—515 R JAMES A. PATTEN, Primary Examiner U.S. Cl. X.R.
260—327 T, 501.1, 515 R, 590, 592, 609 D